United States Patent [19]

Voight

[11] Patent Number: 5,446,370

[45] Date of Patent: Aug. 29, 1995

[54] METHOD AND APPARATUS FOR VERIFYING THE OUTPUT OF A RF SWITCH MATRIX UTILIZED IN A COMMUNICATION SYSTEM

[75] Inventor: John Voight, Mundelein, Ill.

[73] Assignee: Motorola, Inc., Schaumburg, Ill.

[21] Appl. No.: 129,968

[22] Filed: Sep. 30, 1993

[51] Int. Cl.⁶ .............................................. H04B 17/00
[52] U.S. Cl. ........................... 324/76.11; 340/825.79; 455/33.1; 455/67.1; 379/59
[58] Field of Search ............... 455/33.1, 33.2, 67.1, 455/67.5; 379/15, 16, 17, 59, 60; 340/825.79; 324/76.11, 76.19, 415, 418

[56] References Cited

U.S. PATENT DOCUMENTS

| | | | |
|---|---|---|---|
| 3,646,368 | 2/1972 | Mills | 307/269 |
| 3,851,122 | 11/1974 | Gibson | 179/175.23 |
| 4,719,413 | 1/1988 | Basile | 379/280 |
| 4,977,607 | 12/1990 | Maucksch et al. | 455/67.1 |
| 5,170,488 | 12/1992 | Furuya | 455/67.1 |

Primary Examiner—Kenneth A. Wieder
Assistant Examiner—Christopher M. Tobin
Attorney, Agent, or Firm—Richard A. Sonnentag; Daniel C. Crilly

[57] ABSTRACT

A transceiver (203) instructs a RF switch matrix (200) to direct its output to any one of M outputs and likewise sends information related to the power and frequency of the RF input signal and the switched output to an OMC (112). Each output of the matrix (200) is adjusted by an attenuator bank (218) and fed to a spectrum analyzer (233). OMC (112) relays the power, frequency and switched output information to a computer (239) which instructs the spectrum analyzer (233) to perform a power measurement at the frequency of the RF input signal. The computer (239) then determines which outputs of the matrix (200) were switched based on the power level of the RF input signal, the measured power level of the adjusted output signal and a relationship of the different predetermined levels within attenuator bank (218) and verifies by comparison to the switched output information.

12 Claims, 2 Drawing Sheets 5,446,370

METHOD AND APPARATUS FOR VERIFYING THE OUTPUT OF A RF SWITCH MATRIX UTILIZED IN A COMMUNICATION SYSTEM

FIELD OF THE INVENTION

The present invention relates generally to communication systems and more particularly to verifying the output of RF switch matrixes utilized in such communication systems.

BACKGROUND OF THE INVENTION

In communication systems, and more particularly cellular radiotelephone systems, the "cell" may be logically divided into sectors during the cell-site planning stages. Typically, the cell is divided into three (3) or six (6) sectors. Within these sectorized cells, radio frequency (RF) signals from N transceivers may be capable of being switched to any one of the six sectors. In a typical configuration, a RF switch matrix is utilized to direct the N RF signals from the N transceivers to any one of the sectors. However, there is currently no provision in cellular radiotelephone systems to monitor whether the RF switch matrix has indeed taken the correct action when switching any one of the N RF signals to any one of the sectors.

Therefore, a need exists for a method and apparatus to verify that the output of a RF switch matrix utilized in a communication system has been properly switched.

DETAILED DESCRIPTION OF A PREFERRED EMBODIMENT

Figure 1:
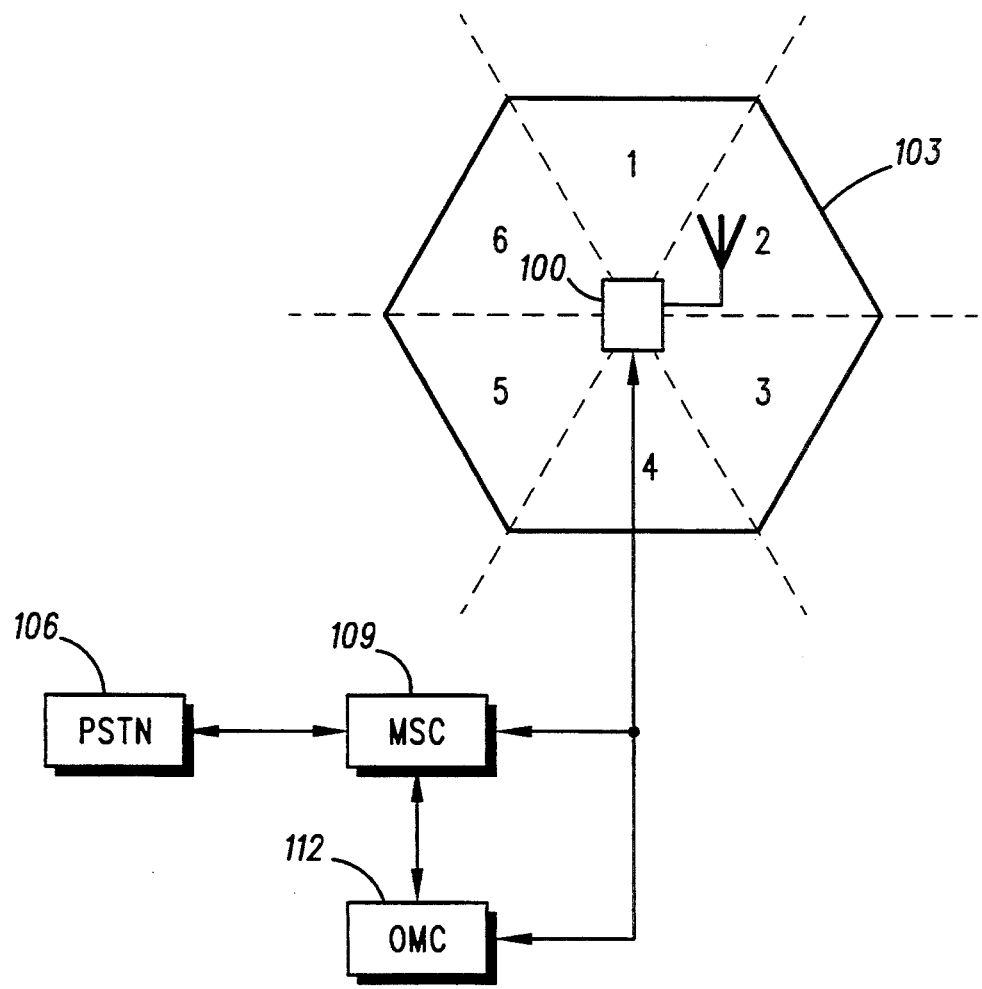
FIG. 1 generally depicts a cellular radiotelephone system which may beneficially employ switch matrix verification in accordance with the invention.

A communication system, and more particularly a cellular radiotelephone system, verifies the output of a switch matrix in accordance with the invention. A transceiver outputs a signal which is input into a RF switch matrix 200. The transceiver instructs RF switch matrix 200 to direct its output to any one of M outputs of the RF switch matrix 200. The transceiver likewise sends information related to the power and frequency of the RF input signal to an Operations and Maintenance Center (OMC) 112. A coupled sample from each output of RF switch matrix 200 is fed into an attenuator bank 218 which adjust each separate output by a different predetermined level. Each adjusted output is combined by a M-way combiner 230 whose output is fed to a spectrum analyzer 233. OMC 112 relays the power and frequency information of the RF input signal to a computer which instructs spectrum analyzer 233 to record a power measurement at the frequency of the RF signal. The computer 239 then determines which of the outputs of the RF switch matrix 200 were switched based on the power level of the RF input signal, the measured power of the adjusted output signal and a relationship of the different predetermined levels within attenuator bank 218.

FIG. 1 generally depicts a cellular radiotelephone system which may beneficially employ RF switch matrix verification in accordance with the invention. As shown in FIG. 1, a cell 103 is sectorized into six sectors 1–6. A base-station 100, which employs transmitters/receivers (transceivers) as are well known in the art, is utilized to establish communication to a mobile station (not shown) within cell 103. Base-station 100 is coupled to a Mobile services Switching Center (MSC) 109 which performs interface and switching functions for the cellular radiotelephone system. MSC 109 also serves as an interface between the cellular radiotelephone system and the Public Switched Telephone Network (PSTN) 106. Base-station 100 is likewise coupled to OMC 112 which provides continuous operations and maintenance status of the cellular radiotelephone system.

Figure 2:
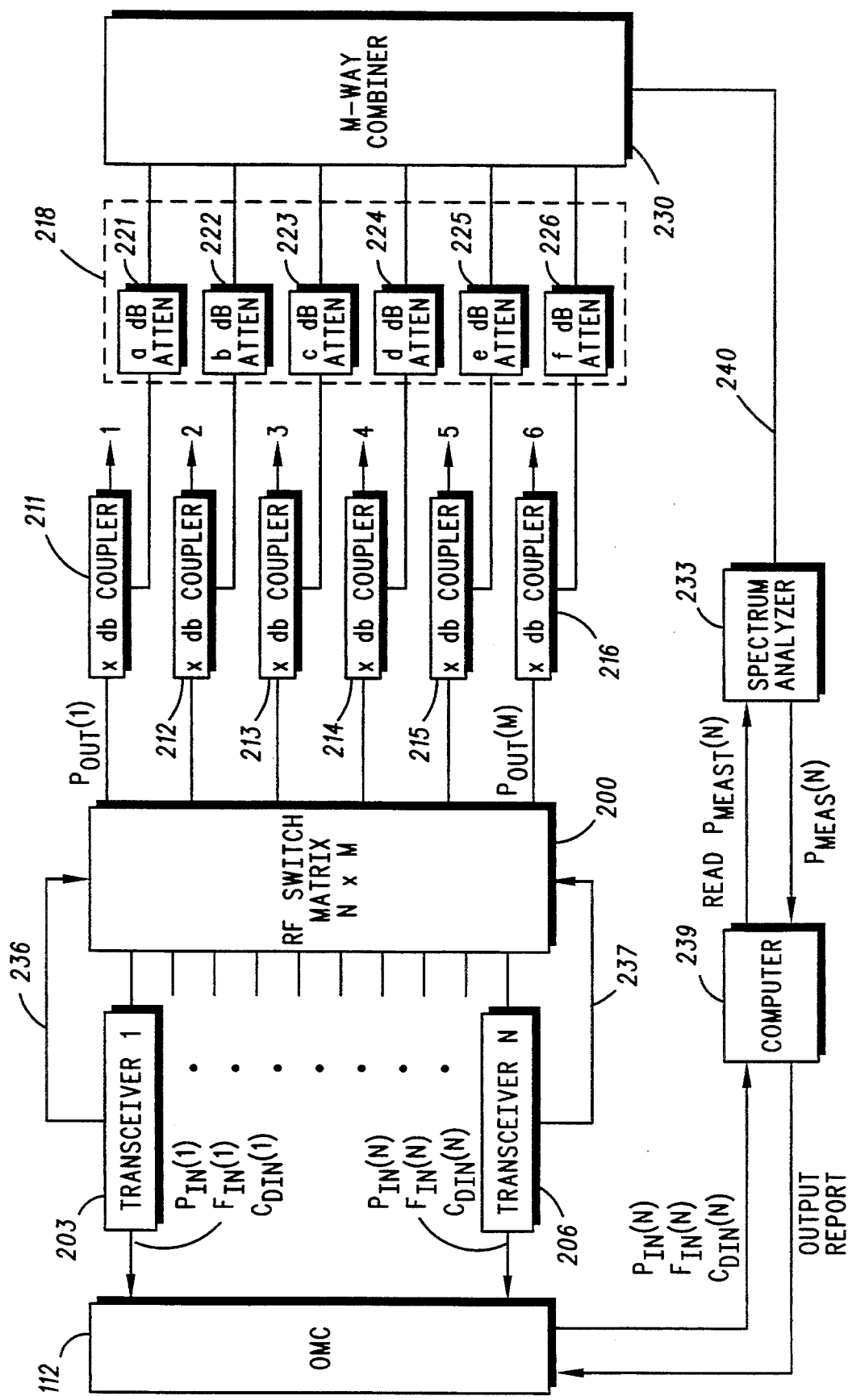
FIG. 2 generally depicts, in block diagram form, a preferred embodiment of switch matrix verification in accordance with the invention.

FIG. 2 generally depicts, in block diagram form, implementation of RF switch matrix output verification in accordance with the invention. As depicted in FIG. 2, a RF switch matrix 200 supports switching of a plurality (N) of input signals at predetermined levels to any one output of a plurality (M) of outputs of the RF switch matrix 200. In the preferred embodiment, N equals 12 and M equals 6. Consequently, a single RF switch matrix 200 can switch the output of 12 transceivers in the preferred embodiment.

When a transceiver, such as transceiver 203, requires switching of the RF switch matrix 200 to a particular sector 1–6, transceiver 203 will send serial control data via line 236 to RF switch matrix 200. The serial control data sent by transceiver 203 instructs the RF switch matrix to select a particular sector 1–6 for its particular input. The output of transceiver 203 is a RF input signal to RF switch matrix 200 at a predetermined level and a predetermined frequency. The predetermined level of the input signal, $P_{in}$, and the frequency of the input signal, $F_{in}$, are likewise output from transceiver 203 to OMC 112. Also relayed to OMC 112 is a portion of serial control data $CD_{in}$ which contains identification of the switched output 1–6. $P_{in}$, $F_{in}$ and $CD_{in}$ are relayed to computer 239 for future determination of which of the outputs of RF switch matrix 200 were switched.

Output from RF switch matrix 200 are six signals which are the output signals intended for sectors 1–6. Each signal output from RF switch matrix 200 has a power level of $P_{out}$. In accordance with the invention, each output 1–6 has a coupler 211–216 attached thereto. The amount of attenuation (X) in db is not critical to the invention, but each coupler 211–216 should be of equal coupling values to maintain consistent insertion loss on the output signal path of RF switch matrix 200. Continuing, each output 1–6 is coupled into an attenuator bank 218 which provide adjustment of the outputs of the RF switch matrix 200. The output from attenuator bank 218 is a plurality of adjusted output signals which enter a M-way combiner 230 which combines each adjusted output signal to a single line 240. Line 240, enters a spectrum analyzer 233 which is utilized to make a power measurement of the adjusted output signal at $F_{in}$. Spectrum analyzer 233 receives a "READ $P_{meas}$" instruction from computer 239 to make this corresponding measurement. The subsequent measurement is relayed from spectrum analyzer 233 to computer 239 as "$P_{meas}$." At this point, computer 239 determines which of the plurality of outputs of the RF switch matrix 200 were switched based on the predetermined level $P_{in}$ of the input signal, the measured power $P_{meas}$ of the adjusted output signal and a relationship of the different predetermined levels of attenuation within attenuator bank 218.

To determine the relationship of the different predetermined (attenuation) levels of attenuator bank 218, the insertion loss of attenuator bank 218 must be determined each time RF switch matrix 200 is switched. The attenuation may be given by the expression:

$$IL_{attenuator\ bank} = P_{in} - P_{meas} - IL_{matrix} - X - IL_{combiner} \quad (1)$$

Referring to the attenuator bank 218, each attenuator 221-226 has attenuation levels which are adequately spaced to account for loss variations elsewhere in the system. Important to note is that the insertion loss from transceiver 203 to RF switch matrix 200 is known, as is the insertion loss through the RF switch matrix 200 itself. Likewise, the insertion loss through M-way combiner 230 is known as is the insertion loss (X) of couplers 211-216. At this point, utilizing the above expression, the insertion loss of attenuator bank 218 can be determined by computer 239.

To determine which of the plurality of outputs of the switch matrix 200 were switched, computer 239 utilizes the relationship of the different predetermined (attenuation) levels given below:

TABLE 1

| If $IL_{attenuator}$ is: | Selected Output Sector is: |
|---|---|
| < (b + a)/2 | 1 |
| > (b + a)/2 and < (c + b)/2 | 2 |
| > (c + b)/2 and < (d + c)/2 | 3 |
| > (d + c)/2 and < (e + d)/2 | 4 |
| > (e + d)/2 and < (f + e)/2 | 5 |
| > (f + e)/2 | 6 |

The values of attenuators 221-226 are known to computer 239, as is the correspondence between the particular attenuator value and the particular output sector 1-6. Thus, for example, if attenuators 221-226 have values A=2, B=4, C=6, D=8, E=10, and F=12, then computer 239 will determine that output 3 of RF switch matrix 200 has been selected if $IL_{attenuator}$ is greater than 5 dB but less than 7 dB (i.e., only attenuator 223, related to output 3, has an attenuation which is between 5-7 dB). Computer 236 then compares the determined output (output 3 in the above example) with the portion of serial control data $CD_{in}$ having the identified switched output to verify that the intended output to be switched has indeed been switched. At this point, computer 239 may send an "Output Report" message to OMC 112 to confirm the verification, or to inform OMC 112 that the output of RF switch matrix has not been properly switched. If this occurs, OMC 112 is then capable of taking appropriate action as required.

While the invention has been particularly shown and described with reference to a particular embodiment, it will be understood by those skilled in the art that various changes in form and details may be made therein without departing from the spirit and scope of the invention.

What I claim is:

1. In a communication system that includes a plurality of transceivers and a switch matrix, each of the plurality of transceivers coupled to a corresponding input of the switch matrix, a method of verifying an output of the switch matrix, the method comprising the steps of:

providing, by the plurality of transceivers, a plurality of input signals at predetermined input levels to the switch matrix;

switching, by the switch matrix, the plurality of input signals to a plurality of outputs of the switch matrix to produce a plurality of output signals;

adjusting each of the plurality of output signals by a different predetermined adjustment level to produce a corresponding plurality of adjusted output signals;

measuring, at a frequency of a first input signal of the plurality of input signals, a level of one adjusted output signal of the plurality of adjusted output signals; and determining which of the plurality of outputs of the switch matrix were switched based on the predetermined input level of the first input signal, the measured level of the one adjusted output signal, and a relationship of the different predetermined adjustment levels to the plurality of outputs of the switch matrix.

2. The method of claim 1 wherein the step of adjusting comprises the step of attenuating each of the plurality of output signals by a different attenuation level to produce the corresponding plurality of adjusted output signals.

3. The method of claim 2 wherein the step of determining further comprises the step of determining which of the plurality of outputs of the switch matrix were switched based on the predetermined input level of the one input signal, the measured level of the one adjusted output signal, and a relationship of the different attenuation levels to the plurality of outputs of the switch matrix.

4. The method of claim 1 wherein the step of determining comprises the steps of:

subtracting the measured level of the one adjusted output signal and an insertion loss of the switching matrix from the predetermined input level of the first input signal to produce an adjusted level;

estimating the predetermined adjustment level applied to the first input signal based on the adjusted level to produce an estimated adjustment level;

averaging at least one pair of the different predetermined adjustment levels to produce at least one average level;

comparing the estimated adjustment level to the at least one average level; and selecting an output of the plurality of outputs of the switch matrix based on the comparison.

5. The method of claim 1 wherein the predetermined input levels and the measured level of the one adjusted output signal are power levels.

6. In a communication system that includes a plurality of transceivers and a switch matrix, the plurality of transceivers providing a plurality of input signals at predetermined input levels to the switch matrix, the switch matrix switching the plurality of input signals to a plurality of outputs to produce a plurality of output signals, an apparatus for verifying an output of the switch matrix, the apparatus comprising:

means for adjusting each of the plurality of output signals by a different predetermined adjustment level to produce a corresponding plurality of adjusted output signals;

means, coupled to the means for adjusting, for measuring, at a frequency of a first input signal of the plurality of input signals, a level of one adjusted output signal of the plurality of adjusted output signals; and means, coupled to the means for measuring, for determining which of the plurality of outputs of the switch matrix were switched based on the predetermined input level of the first input signal, the measured level of the one adjusted output signal, and a relationship of the different predetermined adjustment levels to the plurality of outputs of the switch matrix.

7. The apparatus of claim 6 wherein the means for adjusting comprises an attenuator bank for attenuating each of the plurality of output signals by a different predetermined attenuation level to produce the corresponding plurality of adjusted output signals.

8. The apparatus of claim 6 wherein the means for measuring further comprises a spectrum analyzer.

9. The apparatus of claim 6 wherein the means for determining further comprises a computer.

10. In a communication system that includes a plurality of transceivers and a switch matrix, the plurality of transceivers providing a plurality of input signals at predetermined input levels to the switch matrix, the switch matrix switching the plurality of input signals to a plurality of outputs to produce a plurality of output signals, an apparatus for verifying an output of the switch matrix, the apparatus comprising:

an attenuator bank for attenuating each of the plurality of output signals by a different attenuation level to produce a corresponding plurality of attenuated output signals;

a spectrum analyzer, coupled to the attenuator bank, for measuring, at a frequency of a first input signal, a level of one attenuated output signal of the plurality of attenuated output signals; and a computer, coupled to the spectrum analyzer, for determining which of the plurality of outputs of the switch matrix were switched based on the predetermined input level of the first input signal, the measured level of the one attenuated output signal, and a relationship of the different attenuation levels to the plurality of outputs of the switch matrix.

11. In a communication system that includes a transceiver and a switch matrix, the transceiver providing an input signal at a predetermined input level to one of a plurality of inputs of the switch matrix, a method of verifying an output of the switch matrix, the method comprising the steps of:

switching, by the switch matrix, the input signal to an output of a plurality of outputs of the switch matrix to produce an output signal;

adjusting the output signal by one of a plurality of predetermined adjustment levels to produce an adjusted output signal;

measuring, at a frequency of the input signal, a level of the adjusted output signal; and determining which output of the plurality of outputs of the switch matrix was switched based on the predetermined input level of the input signal, the measured level of the adjusted output signal, and a relationship of the plurality of predetermined adjustment levels to the plurality of outputs of the switch matrix.

12. In a communication system that includes a transceiver and a switch matrix, the transceiver providing an input signal at a predetermined input level to one of a plurality of inputs of the switch matrix, the switch matrix switching the input signal to an output of a plurality of outputs to produce an output signal, an apparatus for verifying an output of the switch matrix, the apparatus comprising:

means for adjusting the output signal by one of a plurality of predetermined adjustment levels to produce an adjusted output signal;

means, coupled to the means for adjusting, for measuring, at a frequency of the input signal, a level of the adjusted output signal; and means, coupled to the means for measuring, for determining which output of the plurality of outputs was switched based on the predetermined input level of the input signal, the measured level of the adjusted output signal, and a relationship of the plurality of predetermined adjustment levels to the plurality of outputs of the switch matrix.

* * * * *